United States Patent [19]

Coyne

[11] 3,838,317

[45] Sept. 24, 1974

[54] CROSS CONNECT SWITCH

[75] Inventor: James Christopher Coyne, New Providence, N.J.

[73] Assignee: Bell Telephone Laboratories, Incorporated, Murray Hill, N.J.

[22] Filed: July 12, 1973

[21] Appl. No.: 378,579

[52] U.S. Cl. ..... 317/119, 317/101 CC, 317/101 CE, 174/68.5, 339/18 C

[51] Int. Cl. .......... H05k 5/00

[58] Field of Search ....... 317/101 CE, 101 CC, 119; 174/68.5; 339/18 C

[56] References Cited

UNITED STATES PATENTS

| | | | |
|---|---|---|---|
| 2,914,706 | 11/1959 | Hill et al. | 317/101 CE |
| 3,486,160 | 12/1969 | Wallace Jr. | 317/101 CC |

FOREIGN PATENTS OR APPLICATIONS

| | | | |
|---|---|---|---|
| 1,412,397 | 9/1969 | Germany | 317/101 CE |

*Primary Examiner*—David Smith, Jr.
*Attorney, Agent, or Firm*—A. D. Hooper

[57] ABSTRACT

A cross connect switch utilizes diagonal conductors on a printed circuit board which wrap around the edges of the board or are fed through the board to provide two conductor segments on the two sides. These conductor segments interconnect pins in respective pin rows on the board so that each conductor is connected to pins which are adjacent pins connected to every other conductor on the board. Thus any conductors on the board can be cross connected by shorting appropriate pin pairs by a short connector. All conductors can be accessed along two edges of the board.

19 Claims, 12 Drawing Figures

CROSS CONNECT SWITCH

BACKGROUND OF THE INVENTION

1. Field of the Invention

This invention relates to cross connect switches and more particularly to a pin connector switch for use in making cross connections in apparatus such as main distributing frames.

2. Description of the Prior Art

The need to provide flexibility of connections between outside cable plant and wire center equipment in telephone offices was recognized wtih the advent of the telephone central office. Thus, a main distributing frame evolved, as disclosed in U.S. Pat. No. 816,847 issued April 3, 1906 to F. B. Cook, which provided terminations for outside plant cable pairs on a fixed basis to a terminal strip on one side of the main distributing frame with similar terminations for inside plant conductors on the other side of the frame. Through the intervening years from the advent of the archetypical main distributing frame, substantial improvements in the technology of automatic switching systems have occurred, but the basic main distributing frame has remained the same.

Basically, a main distributing frame provides a means whereby outside plant cable may be cross connected to a selected central office circuit by placing a cross-connection wire pair or jumper between the appropriate terminal strip appearances on either side of the main distributing frame. The terminal strip terminals also provide a convenient point for maintenance test access.

While the main frame functions satisfactorily so long as there is capacity for the addition of new connections, there is also a continuing need to change and rearrange existing cross connections. This results in high labor costs in the existing main distributing frame because all cross connection changes must be done manually. Also in many cases existing main distributing frames have become completely filled with cross connection wire pairs making it almost impossible to remove an obsolete cross connection before placing a new cross connection. Thus some main distributing frames have become so congested with active and dead cross connection wire pairs that new cross connections cannot be made, and the particular main distributing frames have had to be abandoned and replaced by new main distributing frames. The installation of new frames requires massive replacement and retermination of cables from outside plant and central office circuits along with replacement of the necessary cross connections.

The present main distributing frame is in essence a large terminal switch. Such terminal switches have low initial costs as compared with crosspoint or matrix switches but are difficult to automate because of the overlapping cross connections. On the other hand, presently known cross-point or matrix switches which might be use in a main distributing frame can be automated but are too expensive for normal applications. Thus, a need exists for new concepts in providing the cross connections in main distributing frames in telephone central offices and like apparatus.

Application Ser. No. 295,469 filed Oct. 6, 1972, issued as U.S. Pat. No. 3,796,848 on Mar. 12, 1974 and assigned to the assignee of this invention discloses a pin connector switch which may be used to provide cross connections in an automated main distributing frame. Although the disclosed pin connector switch offers many advantages over existing crosspoint switches, it still has certain disadvantages including the inability to make direct input-to-input or output-to-output connections. Another disadvantage of the disclosed pin connector switch as well as existing crosspoint switches is the inability to access all conductors on the switch along a single edge of the switch for required testing and the inability to make test access without disturbing existing connections on the switch. Another disadvantage of the disclosed pin connector switch is the electrical crosstalk which results from conductors of adjacent subscriber pairs being spaced closer together than the conductors (tip and ring) of the same subscriber pair. Another disadvantage of the disclosed pin connector switch is the narrow conductor paths and spacings which result from an inefficient utilization of space. These crowded conductor paths increase manufacturing costs.

Accordingly, it is an object of this invention to improve cross connect switches used in main distributing frames and like apparatus to provide greater flexibility in placing and removing cross connections thereon.

Another object is to improve cross connect switches to allow direct interconnection of any conductors thereon.

Still another object is to improve cross connect switches to provide easier and more flexible test access thereto.

Another object is to provide a more uniform density of conductor paths so as to increase the width of paths and the spacing between paths.

A further object is to improve crosstalk performance of cross connect switches.

SUMMARY OF THE INVENTION

The foregoing objects and others are achieved in accordance with this invention by a cross connect switch utilizing diagonal conductors on a printed circuit board. A first set of conductors begins along a first edge of the board, proceeds diagonally across the top surface thereof, wraps around the edge of the board or is fed through the board and proceeds diagonally across the bottom surface to a second edge of the board opposite the first edge. Likewise a second set of conductors begins at the first edge, proceeds diagonally across the bottom surface, wraps around the edge of the board and then proceeds diagonally across the top surface to the second edge. Thus each conductor in both sets crosses every other conductor on the board and each conductor has two segments on the two surfaces of the board. The board includes a plurality of rows of pins substantially parallel to the first and second edges with the pins extending through the board. The diagonal conductor segments on the top side of the board interconnect pins in the odd-numbered rows lying therealong and the conductor segments on the bottom side interconnect pins in the even-numbered rows therealong. Thus each unique conductor is connected to pins which are adjacent pins connected to every other conductor on the board. Therefore each conductor can be cross connected to every other conductor by shorting the appropriate pin pairs by a short connector which can be accomplished by automated apparatus. Since all conductors appear at two edges of the board, access for test purposes can be readily obtained even while the switch remains connected to other circuitry such as system wiring.

BRIEF DESCRIPTION OF THE DRAWING

The invention will be more fully comprehended from the following detailed description and accompanying drawing in which:

FIG. 1 is a view of one side of a pin connector switch in accordance with this invention, the opposite side being substantially similar;

DETAILED DESCRIPTION

Figure 1:
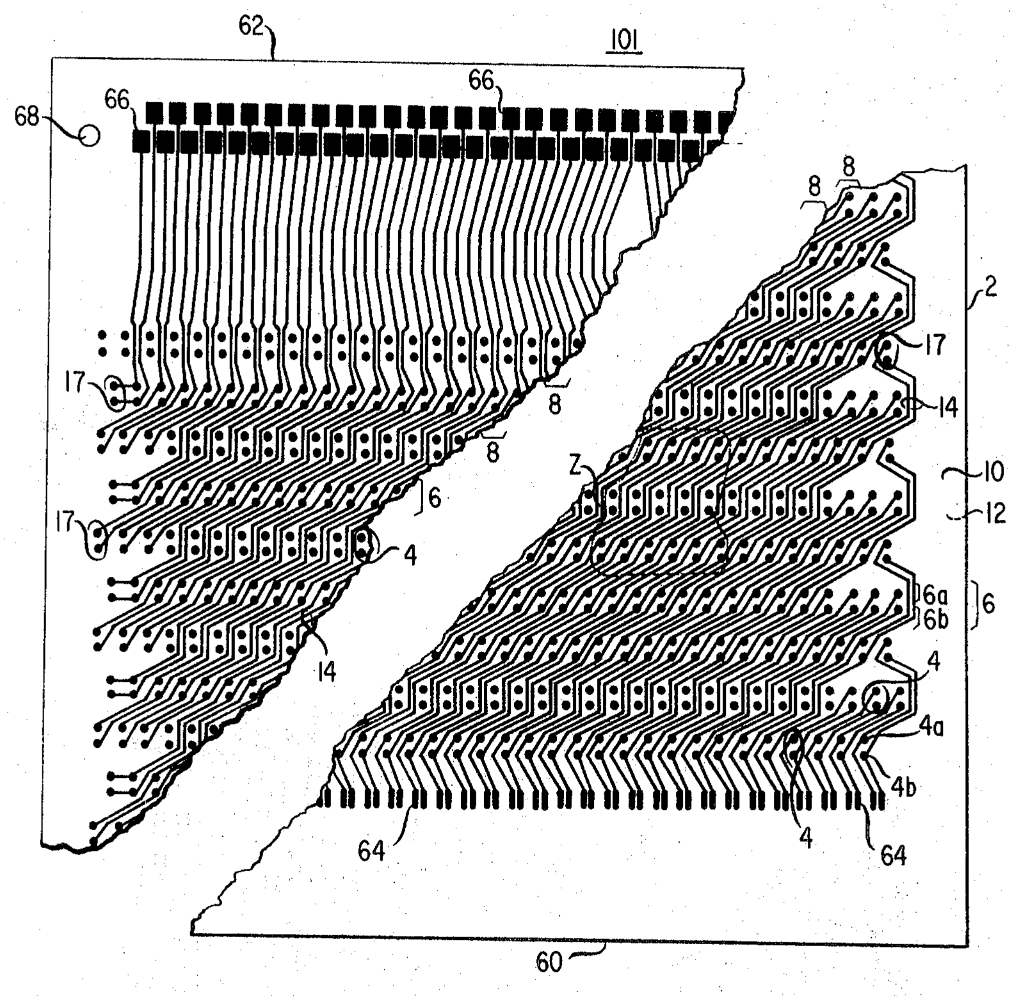

FIG. 1 is a view of one side of a cross connect switch 101 in accordance with this invention which advantageously can be used in an automated main distributing frame. Switch 101 comprises a printed circuit board 2 having a plurality of terminal pins 4 arranged in rows 6 and columns 8 thereon and extending from the major surfaces or sides 10 and 12 thereof. Pins 4 are interconnected in a manner to be subsequently discussed by conductors 14 which run generally at a diagonal with respect to pin rows 6 and the edges of board 2. In the illustrative embodiment the conductors 14 run at a diagonal of approximately 45° with respect to rows 6 with the conductor segments on one surface 10 being substantially orthogonal to the segments on the other surface 12. However, it should be apparent that other angular orientations are equally as valid. The term general direction means the average orientation of conductors 14 and may not coincide with the specific orientation of any portion of the conductors. The term conductor as used in this description can refer to a single conductive element or can refer to a physical pair of conductive elements corresponding to the tip and ring of a telephone wire or line as indicated in FIG. 1. It will be apparent from FIG. 1 that this pair of conductive elements is connected to an associated pair of pin terminals 4*a* and 4*b* located in two closely spaced rows of pins 6*a* and 6*b* and which for purposes of this description are termed a single pin comprising a single row 6. It should be apparent that when conductor 14 comprises a single conductive element, pin 4 will comprise a single pin terminal.

In this embodiment, switch 101 includes a field or set of 64 unique input conductors and a set of 64 unique output conductors which are to be directly interconnected in any desired manner including input-to-output, input-to-input, and output-to-output connections. The layout of conductors 14 on switch 101 for facilitating this direct interconnection will now be discussed with reference to the schematic representation of FIG. 2.

Figure 2:
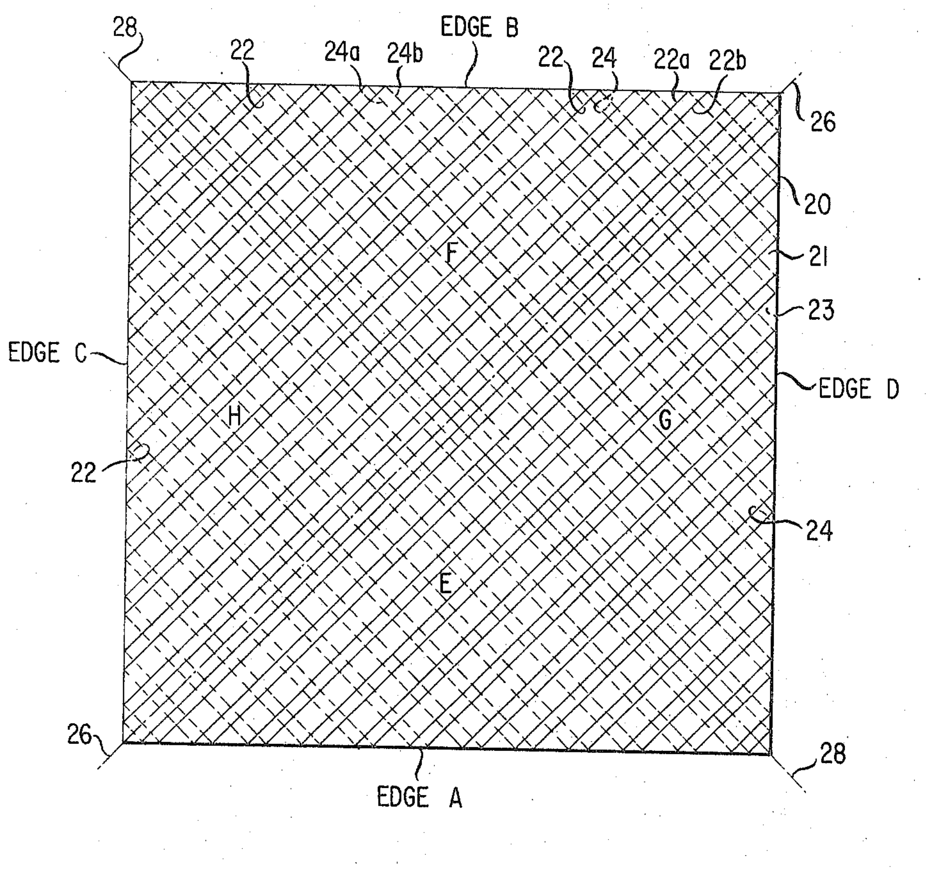
FIG. 2 is a schematic representation of a printed circuit board with diagonal conductors similar to those used in FIG. 1.

A printed circuit board 20 having twelve input and twelve output conductors is illustrated in FIG. 2 for simplicity, but of course any number of conductors including 64 input and 64 output conductors as shown in FIG. 1 can be utilized. The output conductors 22 comprising a pair of conductive elements 22*a* and 22*b* all begin on the top surface or side 21 of board 20 along upper edge B thereof. These output conductors 22 then proceed along board 20 at a downward diagonal with respect to edge B and the pin rows to edge C of board 20. At edge C output conductors 22 wrap around the edge as shown or are fed through plated holes, which is the functional equivalent of a wrap-around, to the opposite side 23 of board 20 where they proceed at a downward diagonal different from their original direction as shown in phantom, to their ending point on bottom surface 23 at edge A. It should be kept in mind that the designation of particular surfaces and edges of board 20 as top and bottom and the resulting direction of the diagonals as up or down is merely a matter of convenience to aid in the description.

Figure 3:
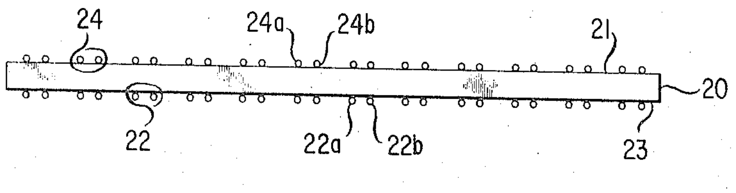
FIG. 3 is a schematic view of an edge of the board of FIG. 2.

In similar fashion, input conductors 24 comprising conductive elements 24*a* and 24*b* begin on the bottom side 23 of board 20 along edge B, proceed at a downward diagonal as shown in phantom to edge D where they wrap around or are fed through holes to the top surface 21. Input conductors 24 then proceed at a downward diagonal different from their original direction, to edge A where they terminate on upper surface 21 of board 20. FIG. 3 is a schematic illustration of edge A showing the ends of respective input conductors 24 and output conductors 22 on top and bottom surfaces 21 and 23, respectively. A view of edge B would be similar except that the respective locations of input and output conductors 24 and 22, respectively, would be inverted.

It should be apparent from FIG. 2 that the use of diagonal conductors as described permits each conductor on board 20 to cross every other conductor on the board. For example, each input conductor 24 crosses every other input conductor 24 as well as all output conductors 22 with the crossing conductors being separated or insulated from each other by board 20 at their respective crossings or intersections. All input-to-output, conductor crossings appear in regions E and F as defined by diagonal lines 26 and 28. All input-to-input conductor crossings appear in region G and all output-to-output conductor crossings appear in region H.

The conductor layout of FIG. 2, even if used in a crosspoint or matrix switch, would offer substantial advantages over existing *x–y* or rectangular crosspoint switches because direct input-to-input and output-to-output intersections are provided. Shorting pins or like devices could be used as known in the art to establish connections at desired crossings. The layout of FIG. 2 could provide a crosspoint density twice as great as the rectangular crosspoint switch because no inherent distinction is made between input and output conductors.

Figure 4:
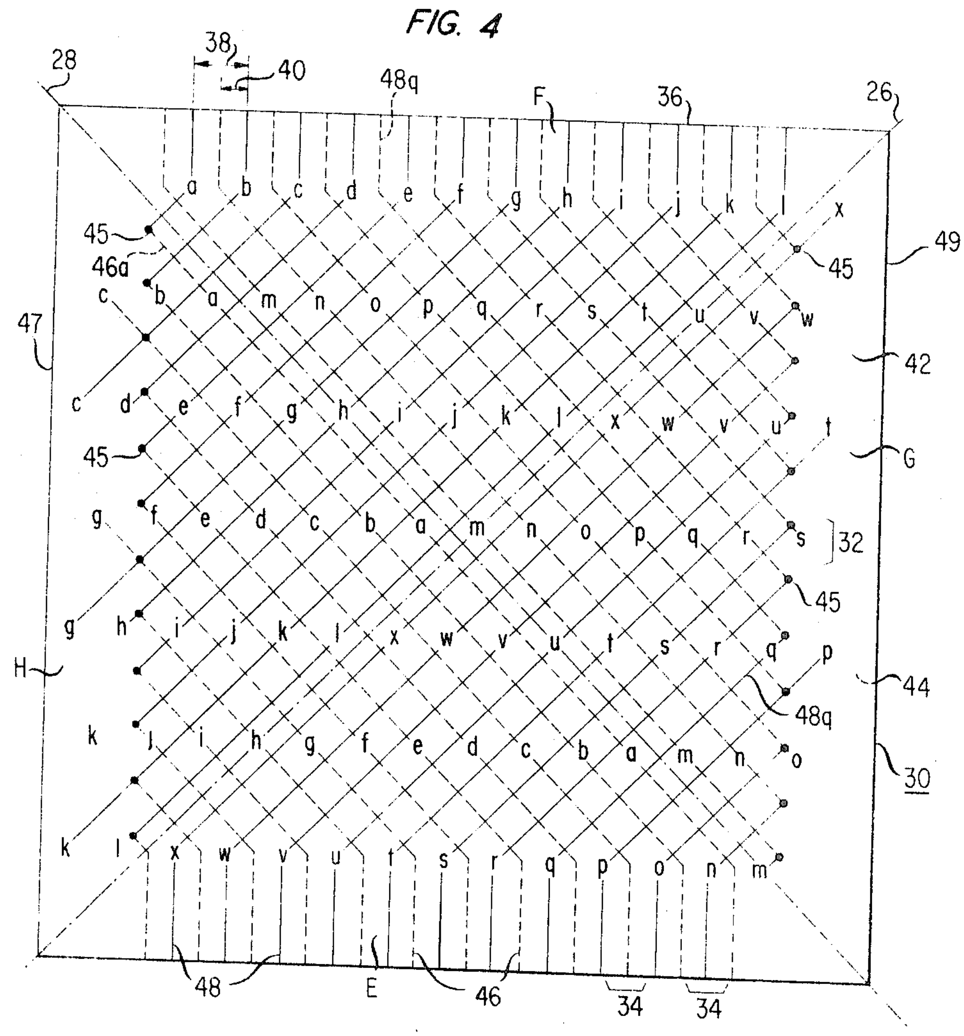
FIG. 4 is a schematic representation of a pin layout advantageously used with the board of FIG. 2.

However, as previously mentioned, a crosspoint switch is inefficient in the use of pin terminals thereon and thus efforts have been made as evidenced by the previously noted application Ser. No. 295,469 to develop pin layouts on pin connector switches which are more efficient than crosspoint switches. FIG. 4 schematically illustrates such a layout of pins which can be used to great advantage with the diagonal conductor layout illustrated in FIG. 2. In FIG. 4 conductors 46 and 48 are illustrated by a single line and associated pins are illustrated by a single letter for simplicity. However, it should be kept in mind that each conductor can comprise a pair of conductive elements and each pin can comprise a pair of pin terminals as previously discussed.

The pins on board 30 of FIG. 4 are arranged in rows 32 and columns 34. The pins in the even-numbered rows as counted from the top edge 36 of board 30 are shifted a distance 40 which equals one-half of a pin spacing 38 with respect to the pins in the odd-numbered rows. Thus two sets of columns 34 are formed by pins in even and odd numbered rows.

Figure 5:
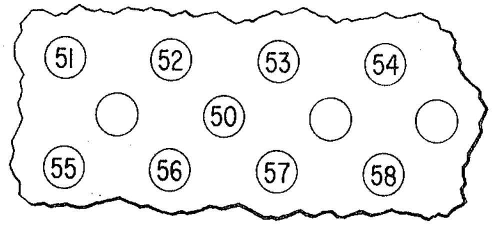
FIG. 5 is a more detailed view of the pin layout of FIG. 4.

In general, in order to reduce the number of pins required to make any possible cross connection between the conductors, each conductor must make a plurality of appearances on the switch, i.e., must be connected to a plurality of electrically common pins located at different points on the switch so that cross connections can be made from these pins to pins associated with all other conductors on the board. This allows each pin connected to a unique conductor to be surrounded and shared by a plurality of pins connected to other unique conductors thereby reducing the total number of pins required on the switch. It has been found that each pin can be surrounded and shared by eight other pins in the two adjacent rows and connections therebetween can readily be established by using small rigid connectors which can be placed by automated apparatus. This is schematically illustrated in FIG. 5 in which pin 50 is surrounded and shared by pins 51 through 58 in the two adjacent rows. Pins 51 through 58 can be said to be adjacent to pin 50 in the sense of being directly connectable thereto. Pins 50 and 51 through 58 can be input pins, output pins or a combination thereof depending upon the particular region of the board in which pin 50 is located.

In order to obtain the shared pin pair arrangement of FIG. 5, the diagonal conductors 46 and 48 on board 30 are given a slope of two pin positions per row 32 of pins traversed thereby. That is, as the conductor 46 or 48 moves diagonally along board 30 from one row 32 of pins to an adjacent row 32, it also travels along the rows 32 relative to the pins therein a distance equal to twice the pin spacing 38. The diagonal conductor segments on the top side 42 of board 30, i.e., those represented by solid lines and having a positive slope, connect all pins in odd-numbered rows lying along the particular segment. Likewise diagonal conductor segments on the bottom side 44 of board 30, i.e., those represented by phantom lines, connect all pins in even-numbered rows. For example, conductor 46*a*, which might represent an output conductor, begins on the top side 42 of board 30 on the left of edge 36 and is thus connected to a pin *a* in the first row 32, i.e., the first odd-numbered row. Conductor 46a then proceeds through feedthrough 45 to the bottom side 44 of board 30 and continues on the bottom side 44 where it is connected to other pins *a* in the second, fourth and sixth rows which are even-numbered rows. Conductor 46*a* can represent the first output conductor and pins *a* represent the pins connected or associated therewith.

Likewise, conductor 48*q*, which can represent the fifth input conductor, begins on bottom side 44 at edge 36 and proceeds downward where it is connected to pins *q* in the second and fourth rows, i.e., even-numbered rows. Conductor 48*q* then proceeds through a feedthrough 45 to top side 42 of board 30 where it is connected to pin pair *q* in the fifth row, an odd-numbered row. Of course, the designation of even-numbered and odd-numbered rows is merely for convenience. The primary feature is that conductor segments on one side of board 30 interconnect common pins in alternate ones of rows 32 while conductor segments on the other side of board 30 interconnect common pins in the other rows. As illustrated by pins *q* in the fourth and fifth rows, common pin pairs can exist in adjacent rows however.

As previously mentioned feedthroughs 45 are the functional equivalent of the conductors 46 and 48 wrapping around the edges of board 30 or having the two segments of the conductors otherwise interconnected. Where feedthroughs 45 are used, pin pairs can lie outside of these feedthroughs 45 as indicated by pin pair *c* in the second row of pin pairs.

A scrutiny of FIG. 4 indicates that each unique pin at some point on board 30 is located adjacent every other unique pin as the term adjacent was discussed with respect to FIG. 5. For example, a pin *q* is at some point located adjacent every other pin *a* through *p* and *r* through *x*. Thus, each conductor on board 30 can be interconnected with every other conductor thereon by shorting the appropriate pins together at the pint where the pins are adjacent. If pin pairs *a* through *l* and *m* through *x* are considered as output pin pairs and input pin pairs, respectively, it can be observed that input-to-output connections occur primarily in regions E and F, input-to-input connections occur in region G and output-to-output connections occur in region H as these regions were defined in FIG. 2.

Figure 6:
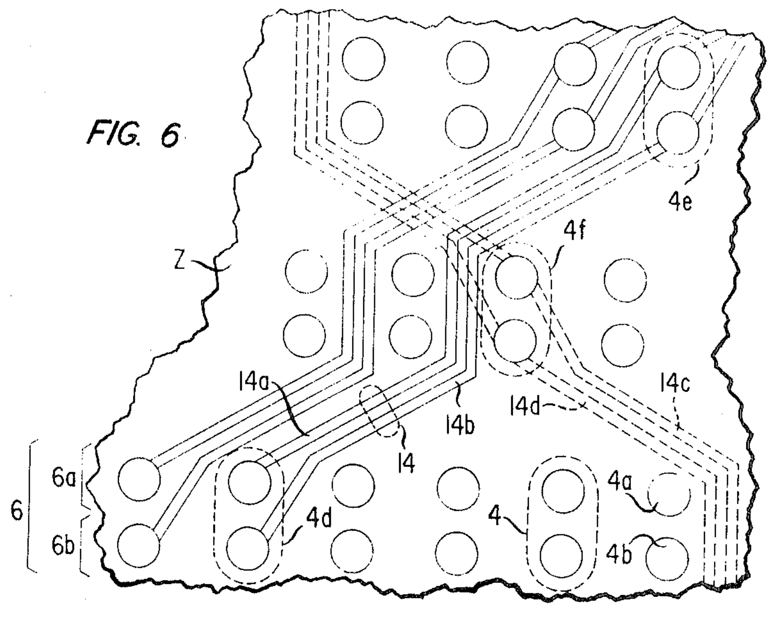
FIG. 6 is an enlarged view of a portion of FIG. 1.

The features discussed with reference to FIGS. 2 through 5 are applied to the switch 101 of FIG. 1 as shown in FIG. 6 which is an enlargement of area Z thereof. FIG. 6 shows three rows 6 of pin pairs 4 each of which includes two rows 6*a* and 6*b* of individual pins 4*a* and 4*b* which can be associated with tip and ring of a telephone circuit. A conductor 14 comprising two elements 14*a* and 14*b*, which might be considered tip and ring in a telephone circuit, interconnects a pin pair 4*d* in one row 6 with another pin pair 4*e* in another row 6 which is spaced therefrom by an intermediate row. Pin pairs 4*f* in the intermediate row are interconnected by conductive elements 14*c* and 14*d* on the opposite side of board 2 as shown in phantom. Conductive elements 14*a–d* do not follow a straight diagonal path as previously illustrated in FIGS. 2 and 4. However, the average slope of these elements is two pin pair positions per row 6 of pin pairs crossed as earlier discussed. THe use of staggered pin positions in adjacent rows and the use of a plurality of straight line segments having different individual slopes but the desired average slope instead of a straight diagonal path of uniform slope between common pin pairs provides substantially more clearance between the conductive elements 14*a–d* and between these elements and pins 4 and thus improves the ease of manufacture and electrical performance of the switch. A further feature is that the two conductive elements 14*a* and 14*b* of a given conductor 14 are not split or separated by other conductor elements and thus crosstalk performance of the switch is improved. Eyelets or plated through holes 17 along respective edges of board 2 as shown in FIG. 1 provide the wrap-around feature for conductors 14 on board 2.

It should also be apparent from FIGS. 2 and 3 that all input and output conductors 24 and 22, respectively appear on respective sides on both edges A and B of board 20 with the input conductors 24 being on top surface 21 along edge A and on bottom surface 23 along edge B and output conductors 22 being just the opposite. This appearance of all conductors along two edges is very advantageous because the conductors can be connected into the desired circuitry such as system wiring along a first edge, e.g., edge A, while subsequent access to all conductors for testing can be made along the second edge, e.g., edge B, without the necessity for disturbing the connections along the first edge. This is shown in FIG. 1 in which edge 60 corresponds to edge A and edge 62 corresponds to edge B. The conductors 14 are connected to conductive lands 64 and 66, respectively, on the respective ends 60 and 62. Lands 64 can be permanently connected to system wiring by a flat cable or the like which can be mass soldered thereto. A rigid spring contact connector can subsequently be placed over end 62 in contact with lands 66 to thereby make contact with any desired conductor 14 without disturbing the system wiring on end 60. Registration holes 68 advantageously can be provided in board 2 to facilitate the accurate positioning of a connector on end 62.

The pin connector switch 101 of this invention can advantageously be used in an automated main distributing frame. A plurality of switches 101 are arranged in a frame such as by being stacked as books on a shelf or by being arranged in a plane. Cross connections thereon, i.e., the shorting together of pin pairs to connect selected conductors, are then established and terminated by automated apparatus.

Figure 7:
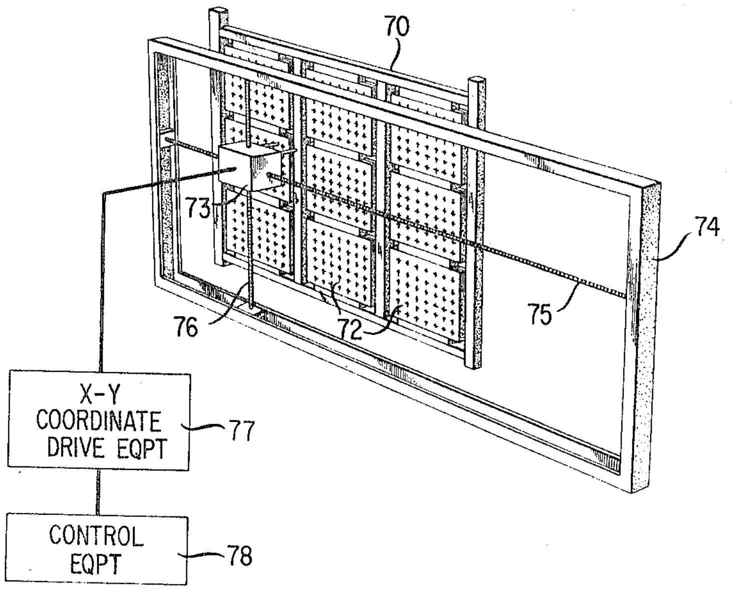
FIG. 7 is a schematic representation of an automated main distributing frame utilizing the switch of FIG. 1.

FIG. 7 schematically illustrates one embodiment of an automated main distributing frame utilizing pin connector switches in accordance with this invention arranged in a plane. A main distribution frame 70 has a plurality of pin connector switches 72 by which subscriber lines (not shown) are interconnected with switching equipment (not shown). Automated equipment 73, which can comprise apparatus known in the art, is mounted in a frame 74 for movement with respect to distributing frame 70 for installing and removing shorting connectors, to be subsequently described, on the pins of switches 72. Equipment 73 can move within frame 74 along perpendicular guides or tracks 75 and 76. The major reuqirements for equipment 73 are that it be able to grasp and insert or remove the connector utilized and that it be able to be positioned very accurately with respect to frame 70 and switches 72. Equipment 73 is directed to a particular location by drive equipment 77 which acts in response to control equipment 78. Control equipment 78 can include a keyboard or other input devices for entering information such as coordinate locations of the specific connections to be established or terminated. Drive equipment 77 and control equipment 78 can comprise apparatus well known in the automated equipment art. It should be apparent that a plurality of frames 70 each containing numerous boards 72 can be connected together and the connectors thereon can be installed and removed by one or more equipments 73.

Figure 8:
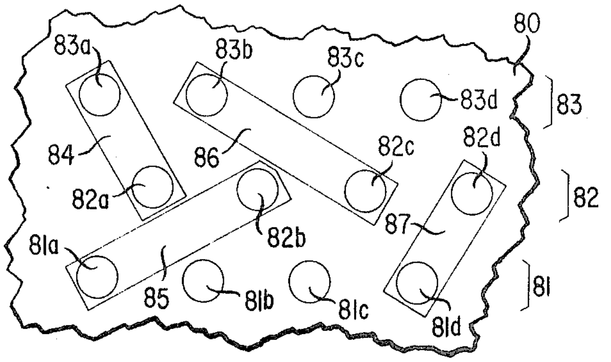
FIG. 8 is a schematic representation of connectors required for making cross connections on the switch of FIG. 1.

FIG. 8 illustrates four connector configurations by which any possible interconnections of adjacent pin pairs as defined with respect to FIG. 5 can be made. Three rows 81, 82, 83 of pin pairs 81*a–d*, 82*a–d*, and 83*a–d*, respectively, are shown. The interconnection of pin pair 82*a* with pin pair 83*a* illustrates a short negative slope connector 84. The connection of pin pair 81*a* with pin pair 82*b* illustrates a long positive slope connector 85. The connection of pin pair 82*c* with pin pair 83*b* illustrates a long negative slope connector 86. The connection of pin pair 81*d* with pin pair 82*d* illustrates a short positive slope connector 87. Because of the pin layout previously described any conductor 14 on switch 101 can be interconnected with any other conductor thereon by connecting the appropriate pin pairs associated with these conductors by one of the described connectors 84 through 87.

Figure 9:
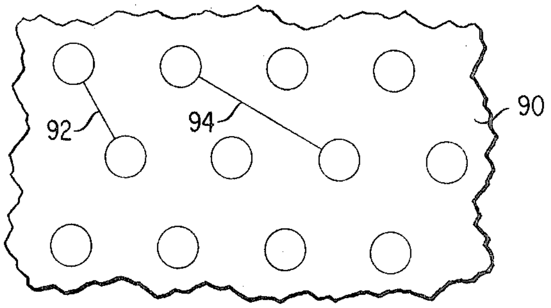
FIGS. 9 and 10 are schematic representations of two sides of a switch utilizing the connectors of FIG. 8.
Figure 10:
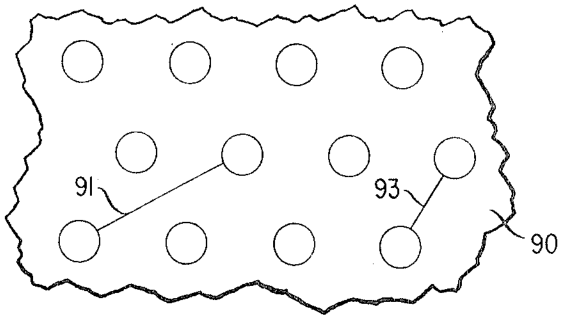

The required number of unique connectors required to make the interconnections illustrated in FIG. 8 can be reduced from four to two by utilizing both sides of the switch for making interconnections. FIG. 9 illustrates a portion of one side of a pin connector switch 90 on which all connections requiring negative slope connectors 92 and 94 are established. FIG. 10 shows an "X-ray" view, i.e., a view as it would appear through a transparent printed circuit board, of the opposite side of the switch 90 on which all connections requiring positive slope connectors 91 and 93 are established. It should be apparent that if the switch 90 is rotated 180°, the connectors 91 and 93 shown in FIG. 10 will appear as negative slope connectors similar to connectors 94 and 92, respectively, of FIG. 9 in a direct view. Accordingly, only short and long negative slope connectors, such as connectors 84 and 86 in FIG. 8, would be required to provide any desired interconnection when both sides of the switch are used for interconnection. A similar analysis would demonstrate that only positive slope connectors could be utilized by reversing the conductor slope on each surface of the switch 90. An additional advantage accruing from the utilization of both sides of the switch for making interconnections is that the possibility of blockage or interference between positive and negative slope connectors is eliminated because there is no crossing of positive and negative slope connectors.

Figure 11:
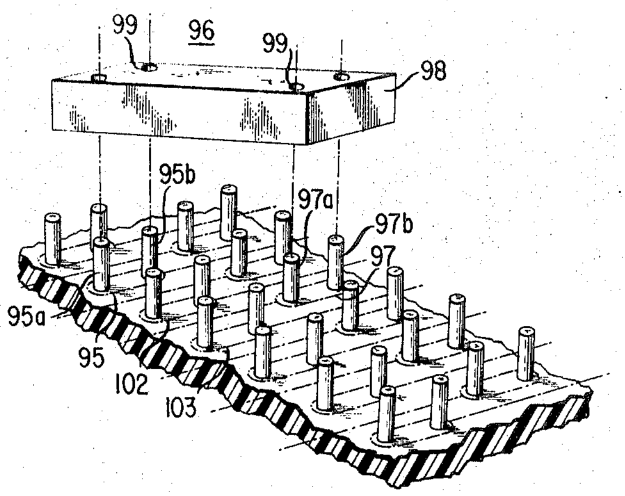
FIG. 11 is an exploded detailed view of an embodiment of one of the connectors of FIG. 8 interconnecting two pairs of pin terminals.

FIG. 11 shows a connector of the type that advantageously can be utilized as connectors 84 to 87 in FIG. 8. In the illustration pin pair 95 comprising a pair of pins 95*a* and 95*b* is to be interconnected by connector 96 with pin pair 97 comprising pin terminals 97*a* and 97*b*. This interconnection of pin pairs 95 and 97 can thereby interconnect two conductors each of which comprises a pair of wires. Connector 96 comprises an insulating body 98 having therein a plurality of contacts 99 in a pattern corresponding to the pattern of pin pairs 95 and 97 and internal conductors connecting appropriate contacts. Connector 96 fits over pin pairs 95 and 97 and electrically interconnects them. The dimensions of connector 96 will of course depend upon the spacings of the pin pairs being interconnected thereby. A relatively short connector can be utilized to connect any pin pair with the four closet pin pairs, i.e., the two closest pin pairs in each of the two adjacent rows, whereas a relatively long connector, such as illustrated in FIG. 11 is needed to establish connections with the four pin pairs which are further removed. FIG. 11 further illustrates how the center of pin pair 97 is symmetrical to or centered between the two pin pairs 102 and 103 in the adjacent row.

The foregoing discussion has been directed to a pin connector switch which can be used in an automated main distributing frame but the principles of the invention have a much broader application. In general, the principles are applicable anywhere a switch having the characteristics of a pin matrix or crosspoint switch is desired. Connections on the subject switch can be established or terminated manually as well as automatically. Further, the switch can be utilized in multistage applications where an output from one switch in one stage comprises an input to a switch in the subsequent stage.

The connector for connecting the appropriate pin pairs has been described in its preferred embodiment as a small rigid structure having contacts therein into which the pins are inserted. The rigid connector could be replaced by short wire straps which could be inserted and removed by automated wiring apparatus. In still another embodiment the pins on the switch could be replaced by receptacles or female contacts while the female contacts on the rigid connector are replaced by pins which are insertable in the appropriate receptacles on the switch.

Figure 12:
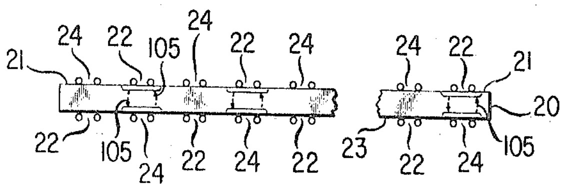
FIG. 12 is a view similar to FIG. 3 of a different layout of the conductors of FIG. 2.

As previously indicated, the diagonally oriented conductors advantageously can be used with a known crosspoint switch to provide a full complement of input-to-output, input-to-input, and output-to-output connections and to provide access to all conductors along two opposite edges. In such a case the layout of FIG. 2 indicates the regions in which the various connections are made at the crosspoints of the conductors. In some applications of such crosspoint switches only input-to-output conductor connections might be desired. In such situations pin pairs need to be provided only in regions E and F as indicated in FIG. 2. An as alternative where only input-to-output connections are desired, the pin pairs can be spaced over the entire area of the switch if the input and output conductors are alternately interspersed with each other so that they appear on edges A and B as indicated in FIG. 12 which is similar to FIG. 3, i.e., the terminations on both edges A and B alternate between input and output conductors 24 and 22, respectively, on both the bottom 23 and top 21 surfaces of board 20. Such an alternating arrangement of terminations between inputs and outputs would present problems with respect to the mass soldering of a flat input (or output) conductor cable to one side of board 20 to establish contact with all input (or output) conductors 24 on board 20. These problems can be avoided by adding a small extension to board 20 which contains eyelets or plated through holes or other rearrangement means to accomplish the translation of conductors 22 and 24 indicated by arrows 105 in FIG. 11.

Various other modifications to the described embodiment may be made by those skilled in the art without departing from the spirit and scope of the invention. For example, the conductors could be divided into groups such as groups of four and all conductors within a specific group could be reflected or wrapped around the edge of the board as a unit by using a group of feedthroughs aligned with the rows of pin terminals. Such a grouping of conductors woudl change the sequence of pin numbers shown in FIG. 4 but the features of diagonal conductors connecting the pins therealong in respective alternate rows would remain the same.

What is claimed is:

1. A cross connect switch for selectively interconnecting a plurality of conductors comprising a plurality of contact means arranged in rows and having substantially equal spacings therebetween within said rows, each of said conductors being connected to a plurality of said contact means so that said conductors can be interconnected by interconnecting said contact means, CHARACTERIZED IN THAT:

each of said conductors comprises first and second segments, said segments having generally diagonal orientations with respect to said rows with said first and second segments of a respective one of said conductors having different said orientation each of said conductors has a crossover with at least one of said segments of every other said conductor, said conductors are insulated from each other at said crossover;

said first segments interconnect respective ones of said contact means therealong in a first group of said rows;

said second segments interconnect respective ones of said contact means therealong in a second group of said rows which alternate with said first group; and said first and second segments have an average slope with respect to said rows of two of said spacings for each of said rows traversed.

2. Apparatus in accordance with claim 1 wherein each of said conductors comprises a pair of conductive elements, and said contact means comprise pairs of pins connected to said pairs of conductive elements whereby said switch can be used for interconnecting telephone conductors comprising two conductive elements.

3. Apparatus in accordance with claim 2 including a connector means for interconnecting each of said pairs of pins in a first row with the four closest others of said pairs of pins in each of the other ones of said rows adjacent said first row whereby each of said conductors can be interconnected with every other one of said conductors.

4. Apparatus in accordance with claim 3 wherein said connector means comprises:

a rigid body of insulating material;

a plurality of electrical contacts mounted in said body and adapted for receiving said pins therein to make contact therewith; and conductors within said body interconnecting said contacts whereby said pins and said conductors are interconnected.

5. Apparatus in accordance with claim 1 including a printed circuit board having first and second sides defined by edges, and wherein said conductors comprise printed conductors formed on said board, said first segment being formed on said first side of said board, said second segment being formed on said second side of said board, and means for connecting said first and second segments.

6. Apparatus in accordance with claim 5 wherein each of said first and second segments has one end terminated along first and second opposing ones of said edges whereby contact can be established with each of said conductors on both said first and second edges.

7. Apparatus in accordance with claim 6 wherein said plurality of conductors comprises a set of input conductors and a set of output conductors, said first and second segments of each of said input conductors having one end terminated along said first and said second edges, respectively; and said first and second segments of each of said output conductors having one end terminated along said second and said first edges, respectively, whereby said input and said output conductors can be contacted on respective sides of said board along respective first and second edges.

8. Apparatus in accordance with claim 7 wherein said board comprises a rectangular board having four regions defined by diagonals through the corners of said board, and said segments having said orientations substantially parallel with respective ones of said diagonals whereby said input and output conductors cross other said input and output conductors, respectively, in respective ones of said regions.

9. Apparatus in accordance with claim 7 wherein said set of input conductors and said set of output conductors include M conductors and N conductors, respectively, where M and N are any positive integers, whereby 2MN unique cross connections can be made on said switch.

10. Apparatus in accordance with claim 9 where M and N each equal 64.

11. Apparatus in accordance with claim 5 wherein said rows of contact means are substantially parallel with a first one of said edges, said first segments interconnect said contact means in odd-numbered ones of said rows with respect to said first edge and said second segments interconnect said contact means in even-numbered ones of said rows with respect to said first edge.

12. Apparatus in accordance with claim 5 wherein said contact means comprise pin terminals and including means for interconnecting said pin terminals to thereby interconnect said conductors.

13. Apparatus in accordance with claim 12 wherein said pin terminals extend from both said first and second sides of said board whereby said pin terminals can be interconnected on both said first and second sides.

14. Apparatus in accordance with claim 5 wherein said connecting means comprises plated openings through said board along respective ones of said edges providing a conducting path through said board for connecting said first and second segments.

15. Apparatus in accordance with claim 1 wherein said pins in one of said rows are shifted along said row a distance equal to one-half of said spacings with respect to said pins in said rows adjacent said one row whereby said pins in alternate ones of said rows are arranged in columns.

16. Apparatus in accordance with claim 1 wherein each of said conductors comprises a pair of conductive elements and each of said contact means comprises a pair of contact elements connected to said pair of said conductive elements.

17. Apparatus in accordance with claim 16 wherein said contact elements comprise pin receptacles.

18. Apparatus in accordance with claim 1 wherein said plurality of conductors comprises 64 input conductors and 64 output conductors.

19. Apparatus in accordance with claim 1 including means for connecting each of said contact means in a first one of said rows with any one of the four closest others of said contact means in any row adjacent said first row whereby any one of said conductors can be interconnected to any other one of said conductors.

* * * * *